United States Patent [19]

Dubs et al.

[11] 3,900,498

[45] Aug. 19, 1975

[54] 2-THIETANOLS AND THEIR PREPARATION

[75] Inventors: Paul Dubs, Zug; Heiner Kuntzel, Oberengstringen; Mario Pesaro, Zurich, all of Switzerland

[73] Assignee: Givaudan Corporation, Clifton, N.J.

[22] Filed: Apr. 5, 1973

[21] Appl. No.: 348,444

[30] Foreign Application Priority Data

Apr. 12, 1972 Switzerland.......................... 5353/72

[52] U.S. Cl............... 260/327 R; 99/140 R; 426/65
[51] Int. Cl............................................ C07d 61/00
[58] Field of Search................................ 260/327 R

[56] References Cited

UNITED STATES PATENTS

| 1,018,329 | 2/1912 | Lilienfeld........................ 260/327 R |
| 3,432,475 | 3/1969 | McKillip et al.................... 260/77.5 |

OTHER PUBLICATIONS

Chemical Abstracts, Vol. 54, Subject Index, p. 1770s.

*Primary Examiner*—Henry R. Jiles
*Assistant Examiner*—C. M. S. Jaisle
*Attorney, Agent, or Firm*—Thomas Cifelli, Jr.

[57] ABSTRACT

2-Thietanols, process for preparing same, and flavorant compositions containing same are disclosed.

22 Claims, No Drawings

2-THIETANOLS AND THEIR PREPARATION

FIELD OF THE INVENTION

This invention relates to the field of flavorants.

SUMMARY OF THE INVENTION

The 2-thietanols provided by the present invention have the following general formula $$\underset{R^2}{\overset{R^1}{>}}C\underset{S}{\overset{\underset{|}{CH}}{<}}CH-OH \quad (I)$$

wherein $R^1$ represents a hydrogen atom or a $C_{1-10}$ alkyl group, $R^2$ represents a hydrogen atom or a $C_{1-3}$ alkyl group and $R^3$ represents a hydrogen atom or a $C_{1-3}$ alkyl group.

According to the process provided by the present invention, the 2-thietanols of formula I hereinbefore are manufactured by reacting an $\alpha,\beta$-unsaturated aldehyde of the general formula $$\text{(II)}$$

wherein $R^1$, $R^2$ and $R^3$ have the significances given earlier, with hydrogen sulphide.

The 2-thietanols of formula I hereinbefore are distinguished by particular flavour properties. As a result of their odour and flavour notes, which are partly reminiscent of fried eggs and meat and partly reminiscent of onions, they are suitable for the manufacture or for the modification of aroma compositions or for the production of the typical egg and meat odour or flavour of foodstuffs and delicacies, especially of dishes prepared with eggs, noodles, etc or dishes prepared with meat, or for the aromatisation of soups and for seasoning in order to impart, for example, an onion aroma.

DESCRIPTION OF THE PREFERRED EMBODIMENTS

As aforesaid, the 2-thietanols provided by the present invention have the following general formula $$\underset{R^2}{\overset{R^1}{>}}C\underset{S}{\overset{\underset{|}{CH}}{<}}CH-OH \quad (I)$$

wherein $R^1$ represents a hydrogen atom or a $C_{1-10}$ alkyl group, $R^2$ represents a hydrogen atom or a $C_{1-3}$ alkyl group and $R^3$ represents a hydrogen atom or a $C_{1-3}$ alkyl group.

The aforementioned $C_{1-3}$ or $C_{1-10}$ alkyl groups can be straight-chain or branched-chain. Examples of such groups are methyl, ethyl, propyl, isopropyl, butyl, isobutyl, tertbutyl, hexyl, octyl and decyl. Preferred 2-thietanols of formula I are those in which $R^1$ and $R^3$ represent a hydrogen atom or a $C_{1-3}$ alkyl group and $R^2$ represents a hydrogen atom.

According to the process provided by the present invention, the 2-thietanols of formula I hereinbefore are manufactured by reacting an $\alpha,\beta$-unsaturated aldehyde of the general formula $$\text{(II)}$$

wherein $R^1$, $R^2$ and $R^3$ have the significances given earlier, with hydrogen sulphide.

The reaction can be carried out in the presence of, or in the absence of, a solvent. When it is carried out in the presence of a solvent, the solvents of primary interest are those in which hydrogen sulphide is readily soluble, preferably carbon disulphide or halogenated hydrocarbons such as chloroform or methylene chloride.

The reaction is expediently carried out at a temperature of between $-50°C$ and room temperature, preferably at between $-10°C$ and $0°C$.

The reaction can be catalysed by bases, especially organic bases such as amines and preferably tertiary amines (e.g. triethylamine or pyridine).

The molar proportion of hydrogen sulphide to $\alpha,\beta$-unsaturated aldehyde of formula II should amount to at least 1:1. An excess of hydrogen sulphide is expediently used. The molar proportion of base to $\alpha,\beta$-unsaturated aldehyde of formula II can amount to from 1:1000 up to about 1:1 with a ratio of about 1:10 to 1:5 being preferred.

The reaction times are dependent on the reaction temperature, the proportions of the reaction partners as well as the structure of the $\alpha,\beta$-unsaturated aldehyde used. When the reaction is carried out at a temperature of about $-10°C$ to $0°C$, an excess of hydrogen sulphide is used and an amount of base of about 1:10 to 1:5 is used, the reaction time amounts to about 2 to 15 hours.

The isolation and purification of the reaction product can be carried out according to methods known per se. For example, a mineral acid is added, the mixture is stirred at room temperature, taken up in an organic solvent, the organic phase is washed neutral, dried and the product is isolated in pure form by fractional distillation.

The 2-thietanols of formula I hereinbefore are distinguished by particular flavour properties. As a result of their odour and flavour notes, which are partly reminiscent of fried eggs and meat and partly reminiscent of onions, they are suitable for the manufacture or for the modification of aroma compositions or for the production of the typical egg and meat odour or flavour of foodstuffs and delicacies, especially of dishes prepared with eggs, noodles, etc. or dishes prepared with meat, or for the aromatisation of soups and for seasoning in order to impart, for example, an onion aroma.

The 2-thietanols of formula I can be added to the products to be aromatised either alone or in admixture with other flavour-imparting substances or with the usual carrier materials and/or diluents. If the 2-thietanols are used for the manufacture of artificial aromas, these aromas can be formulated, for example, in the form of liquids, pastes or powders. The products can, for example, be spray-dried, vacuum-dried or lyophilised. The formulation of such artificial aromas as well as the aromatisation of foodstuffs and delicacies can be carried out in a manner known per se.

The amount of the 2-thietanols of formula I used for the purpose of aromatisation can vary within wide limits. In aroma compositions, an amount to 0.01–10 wt.%, preferably 0.1–1.0 wt.%, can be present and in aromatised products, i.e. finished foodstuffs or delicacies, an amount of 0.1–1000 ppm can be present.

It will be appreciated that the invention also includes within its scope (a) an aroma composition containing as an essential aroma-imparting ingredient a 2-thietanol of formula I hereinbefore and (b) a method of imparting an aroma to foodstuffs and delicacies by applying thereto or incorporating therein an aroma-imparting amount of a 2-thietanol of formula I or of an aroma composition as hereinbefore defined.

The following Examples illustrate the process provided by the present invention:

EXAMPLE 1

Hydrogen sulphide was led for 1.5 hours at −10°C into 250 ml of chloroform up to saturation. With stirring and further continuous introduction of hydrogen sulphide, there were added dropwise, firstly and within 10 minutes, 10 ml of triethylamine and then, within 2 hours, 52 g of freshly distilled crotonaldehyde. The mixture was stirred for a further 2 hours at −10°C with slight introduction of hydrogen sulphide. The solution was then left to stand for 12 hours at −28°C in a closed flask, 125 ml of 2-N hydrochloric acid were added at room temperature and the mixture was stirred vigorously for 1 hour. The organic phase was separated off, washed with 125 ml of 2-N hydrochloric acid, subsequently washed neutral with water, dried over anhydrous sodium sulphate and concentrated under a water-jet vacuum.

Distillation over a Widmer column yielded 46.7 g (yield 41% of theory) of 4-methyl-2-thietanol in the form of a water-clear highly viscous oil of boiling point$_{15}$ 60°–63°C; $n_D^{20}$ = 1.5476. The IR spectrum (liquid) showed bands at 3400, 2950, 1450, 1045 and 985 cm$^{-1}$.

The product has an egg-like, sulphurous and somewhat onion-like odour and an egg- and omelette-like flavour.

EXAMPLE 2

In an analogous manner to that described in Example 1, 42 g of acrolein were treated with 10 ml of triethylamine and hydrogen sulphide in 250 ml of chloroform. Distillation with the addition of BHT [2,6-di(tert-butyl)-p-cresol] yielded 37.6 g (yield 56% of theory) of 2-thietanol of boiling point $_{15}$ 50°–62°C; $n_D^{20}$ = 1.5712. The IR spectrum (4% in chloroform) showed bands at 3400, 2950, 1430 and 1010 cm$^{-1}$.

The product has an egg- and meat-like odour with a roast-note (fried potato) and an egg-like, sulphurous flavour with a note in the direction of fried potato.

EXAMPLE 3

In an analogous manner to that described in Example 1, 9.8 g of 2-hexenal were treated with 2.0 ml of triethylamine and hydrogen sulphide in 50 ml of chloroform at a temperature of 0°C. Bulb-tube distillation at an oven temperature of 130°–150°C and a pressure of 0.05 mm Hg yielded 2.12 g (yield 16% of theory) of 4-propyl-2-thietanol; $n_D^{20}$ = 1.5214. The IR spectrum (liquid) showed bands at 3450, 2960, 1460 and 1020 cm$^{-1}$.

The odour of the product is green, treebark-like and reminiscent of unripe tomatoes.

EXAMPLE 4

In an analogous manner to that described in Example 1, 5.6 g of 3-methyl-crotonaldehyde were treated at a temperature of 0°C with 1.5 ml of triethylamine and hydrogen sulphide in 50 ml of chloroform. Bulb-tube distillation at an oven temperature of 145°–175°C and a pressure of 0.05 mm Hg yielded 4.21 g (yield 53% of theory) of 4,4-dimethyl-2-thietanol in the form of an oil; $n_D^{20}$ = 1.5365. The IR spectrum showed bands at 3450, 2980, 1460, 1130 and 1020 cm$^{-1}$.

The product has a tarry, sulphurous odour which is somewhat reminiscent of onion. The flavour is onion-like and sulphurous.

EXAMPLE 5

In an analogous manner to that described in Example 1, 9.7 g of 2-methyl-2-pentenal were treated at a temperature of 0°C with 2.5 ml of triethylamine and hydrogen sulphide in 60 ml of chloroform. Bulb-tube distillation at an oven temperature of 112°–130°C and a pressure of 0.05 mm Hg produced 8.04 g (yield 61% of theory) of 4-ethyl-3-methyl-2-thietanol in the form of an oil; $n_D^{20}$ = 1.5268. The IR spectrum showed bands at 3450, 2980, 1455, 1380 and 1050 cm$^{-1}$.

The product has a sulphurous and weakly nut-like odour. The flavour is strongly sulphurous with a slight egg note.

EXAMPLE 6

In an analogous manner to that described in Example 1, 24 g of α-isopropylacrolein were treated with 5 ml of triethylamine and hydrogen sulphide in 150 ml of chloroform at a temperature of −3°C. Distillation over a Vigreux column with the addition of 1% 2,6-di(tert-butyl)-p-cresol yielded 23.42 g (yield 84% of theory) of colourless 3-isopropyl-2-thietanol of boiling point$_{0.01}$ 30°–33°C; $n_D^{20}$ = 1.5312. The IR spectrum (liquid) showed bands at 3450, 2980, 1470 and 1000 cm$^{-1}$.

The odour of the product is sulphurous and egg-like, while the flavour is sulphurous, slightly greenish and somewhat burnt.

EXAMPLE 7

In an analogous manner to that described in Example 1, 25 g of α-ethylacrolein were treated with 5 ml of triethylamine and hydrogen sulphide in 100 ml of chloroform at a temperature of −2°C. Distillation over a Vigreux column with the addition of 1% 2,6-di(tertbutyl)-p-cresol produced 23.18 g (yield 65% of theory) of 3-ethyl-2-thietanol in the form of a colourless viscous oil of boiling point$_{0.06}$ 40°–44°C; $n_D^{20}$ = 1.5418. The IR spectrum (liquid) showed bands at 3450, 2980, 1460, 1050 and 980 cm$^{-1}$.

The odour of the product can be described as egg-like, sulphurous and greenish; the flavour is sulphurous, weakly green.

EXAMPLE 8

In an analogous manner to that described in Example 1, 4.2 g of 2-pentenal were treated with 1.2 ml of triethylamine and hydrogen sulphide in 30 ml of chloroform at a temperature of −5°C. Distillation through a Hempel column with the addition of a small amount of 2,6-di(tertbutyl)-p-cresol yielded, at 48°–70°C and 0.7 mm Hg, 3.7 g (yield 55% of theory) of colourless, viscous 4-ethyl-2-thietanol; $n_D^{20} = 1.5320$. The IR spectrum showed bands at 3450, 2980, 1460, 1385 and 1010 cm$^{-1}$.

The odour of the product is sulphurous and egg-like in the direction of fried eggs, while the flavour is sulphurous-green and egg-like.

EXAMPLE 9

In an analogous manner to that described in Example 1, 52.2 g of methacrolein were treated with 10 ml of triethylamine and hydrogen sulphide in 250 ml of chloroform at a temperature of 0°C. The crude product was distilled under a high vacuum with the addition of 5% 2,6-di(tertbutyl)-p-cresol. 39.8 g (51% of theory) of 3-methyl-2-thietanol ($n_D^{20} = 1.5513$) were obtained at a temperature of 75°–89°C/0.03 mm Hg. The IR spectrum (liquid) showed bands at 3450, 2960, 1455, 1380 and 1030 cm$^{-1}$.

The product has a sulphurous and meat-like odour which is reminiscent of over-fried eggs, while the flavour is greenish-sulphurous, egg- and meat-like.

The following Example illustrates a typical aroma composition containing one of the 2-thietanols provided by this invention:

EXAMPLE

Aroma Composition with egg note:

|  | parts by weight |
| --- | --- |
| 4-nonanolide | 0.2 |
| caproic acid | 0.3 |
| maltol | 0.5 |
| valeric acid | 0.5 |
| lactic acid ethyl ester | 1.5 |
| vanillin | 4.0 |
| lactic acid | 7.0 |
| butyric acid ethyl ester | 10.0 |
| diacetyl | 25.0 |
| butyric acid | 30.0 |
| ethanol | 21.0 |
|  | 100.0 |

By the addition of 0.5 part by weight of the 2-thietanol of this invention to the foregoing mixture there is obtained a composition having a pronounced typical egg note. It will be understood that smaller or larger amounts within the range from about 0.01 to 10 wt. %, preferably 0.1 to 1.0 wt. %, of 2-thietanol may be used, as aforesaid.

The resulting aroma compositions maybe incorporated into finished food stuffs in the usual manner, in amounts to result in about 0.1–1000 PPM of the 2-thietanols.

What we claim is:

1. A 2-thietanol of the general formula

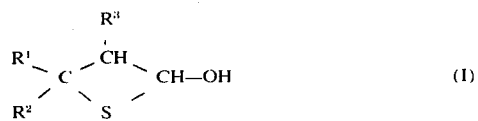
(I)

wherein $R^1$ represents a hydrogen atom or a $C_{1-10}$ alkyl group, $R^2$ represents a hydrogen atom or a $C_{1-3}$ alkyl group and $R^3$ represents a hydrogen atom or a $C_{1-3}$ alkyl group.

2. 2-Thietanol.
3. 4-Methyl-2-thietanol.
4. 4-Ethyl-2-thietanol.
5. 4-Ethyl-3-methyl-2-thietanol.
6. 4-Propyl-2-thietanol.
7. 4,4-Dimethyl-2-thietanol.
8. 3-Methyl-2-thietanol.
9. 3-Ethyl-2-thietanol.
10. 3-Isopropyl-2-thietanol.
11. A process for the manufacture of the 2-thietanols of formula I given in claim 1, which process comprises reacting an α, β-unsaturated aldehyde of the general formula

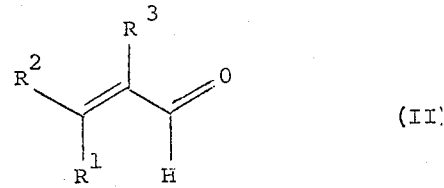
(II)

wherein $R^1$, $R^2$ and $R^3$ have the significances given in claim 1, with hydrogen sulphide.

12. A process according to claim 11, wherein the reaction is carried out in the presence of a tertiary amine.

13. A process according to claim 11, wherein the 2-thietanol is isolated from the reaction mixture.

14. A process according to claim 11, wherein acrolein is used as the α, β-unsaturated aldehyde to yield 2-thietanol.

15. A process according to claim 11, wherein crotonaldehyde is used as the α, β-unsaturated aldehyde to yield 4-methyl-2-thietanol.

16. A process according to claim 11, wherein 2-pentenal is used as the α, β-unsaturated aldehyde to yield 4-ethyl-2-thietanol.

17. A process according to claim 11, wherein 2-methyl-2-pentenal is used as the α, β-unsaturated aldehyde to yield 4-ethyl-3-methyl-2-thietanol.

18. A process according to claim 11, wherein 2-hexenal is used as the α, β-unsaturated aldehyde to yield 4-propyl-2-thietanol.

19. A process according to claim 11, wherein 3-methyl-crotonaldehyde is used as the α, β-unsaturated aldehyde to yield 4,4-dimethyl-2-thietanol.

20. A process according to claim 11, wherein methacrolein is used as the α, β-unsaturated aldehyde to yield 3-methyl-2-thietanol.

21. A process according to claim 11, wherein α-ethyla-crolein is used as the α, β-unsaturated aldehyde to yield 3-ethyl-2-thietanol.

22. A process according to claim 11, wherein α-isopro-pylacrolein is used as the α, β-unsaturated aldehyde to yield 3-isopropyl-2-thietanol.

* * * * *

UNITED STATES PATENT OFFICE
CERTIFICATE OF CORRECTION

Patent No. 3,900,498  Dated August 19, 1975

Inventor(s) Paul Dubs et al.

It is certified that error appears in the above-identified patent and that said Letters Patent are hereby corrected as shown below:

Column 5, Example 9, line 43, ".0" should come directly after 21 to read -- 21.0 --.

Column 6, line 56, claim 21, "α-ethyla-crolein" should read -- α-ethylacrolein --.

Signed and Sealed this second Day of December 1975

[SEAL]

Attest:

RUTH C. MASON  
Attesting Officer

C. MARSHALL DANN  
Commissioner of Patents and Trademarks